United States Patent [19]

Asano

[11] 4,447,181
[45] May 8, 1984

[54] TOOL HOLDER
[75] Inventor: Toshitake Asano, Tokyo, Japan
[73] Assignee: Ikegai Tekko Kabushiki Kaisha, Tokyo, Japan
[21] Appl. No.: 416,088
[22] Filed: Sep. 8, 1982
[51] Int. Cl.³ .......................................... B23B 47/00
[52] U.S. Cl. ............................ 409/345; 29/DIG. 46; 82/DIG. 9; 407/8
[58] Field of Search ................. 408/143, 151, 239 A, 408/234; 82/DIG. 9; 279/1 A, 1 Q, 1 W; 52/167, 403; 409/141, 235, 345; 407/8, 120; 29/DIG. 46

[56] References Cited

U.S. PATENT DOCUMENTS

| | | | |
|---|---|---|---|
| 2,051,954 | 8/1935 | Leland | 77/58 |
| 2,426,359 | 8/1947 | Lankheet | 77/58 |
| 2,591,115 | 4/1952 | Austin | 29/96 |
| 2,960,189 | 11/1960 | Osburn | 188/1 |
| 3,230,833 | 1/1966 | Shurtliff | 90/11 |
| 3,633,116 | 5/1972 | Muller et al. | 408/143 |
| 3,800,380 | 4/1974 | Cline et al. | 407/118 |
| 3,838,936 | 10/1974 | Andreassen et al. | 408/143 |
| 4,097,179 | 6/1978 | Gersch | 408/151 |
| 4,183,270 | 1/1980 | Castagne | 82/36 A |
| 4,197,771 | 4/1980 | Heaton et al. | 82/36 B |
| 4,320,549 | 3/1982 | Greb | 52/167 |

FOREIGN PATENT DOCUMENTS

| | | | |
|---|---|---|---|
| 57-3504 | 1/1982 | Japan | 82/DIG. 9 |
| 776770 | 11/1980 | U.S.S.R. | 82/DIG. 9 |

Primary Examiner—William R. Briggs
Assistant Examiner—Lawrence Meier
Attorney, Agent, or Firm—Wood, Dalton, Phillips, Mason & Rowe

[57] ABSTRACT

A tool holder (10) for mounting a tool T to a carrier (11), base member (12) and a tool holding member (13) secured together to form the tool holder unit. Confronting surfaces (19,20) of the tool holder members are disposed in facial engagement about the periphery of a recess (21) receiving a resilient pad (22). The compressed pad provides an antivibration, antichattering effect in the use of the tool holder.

10 Claims, 4 Drawing Figures

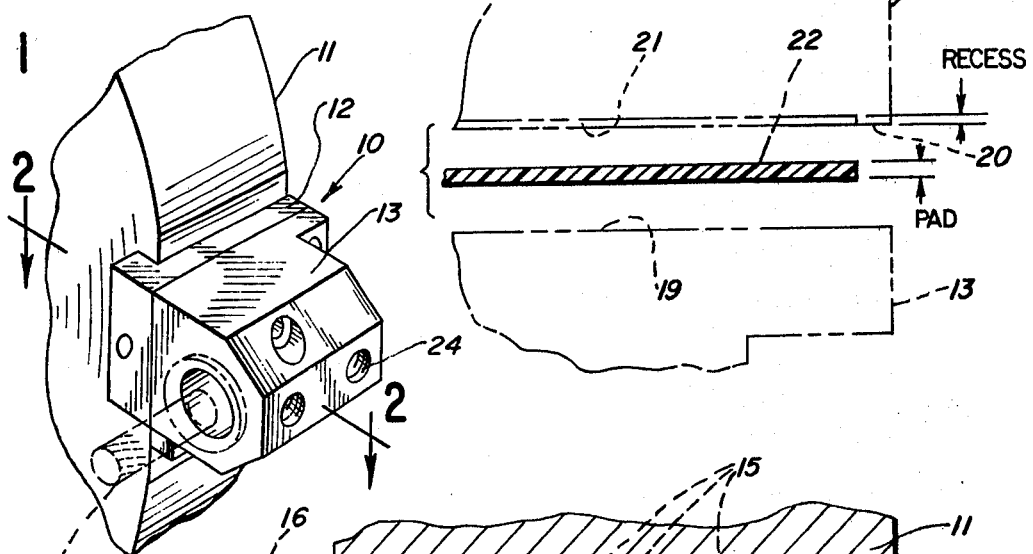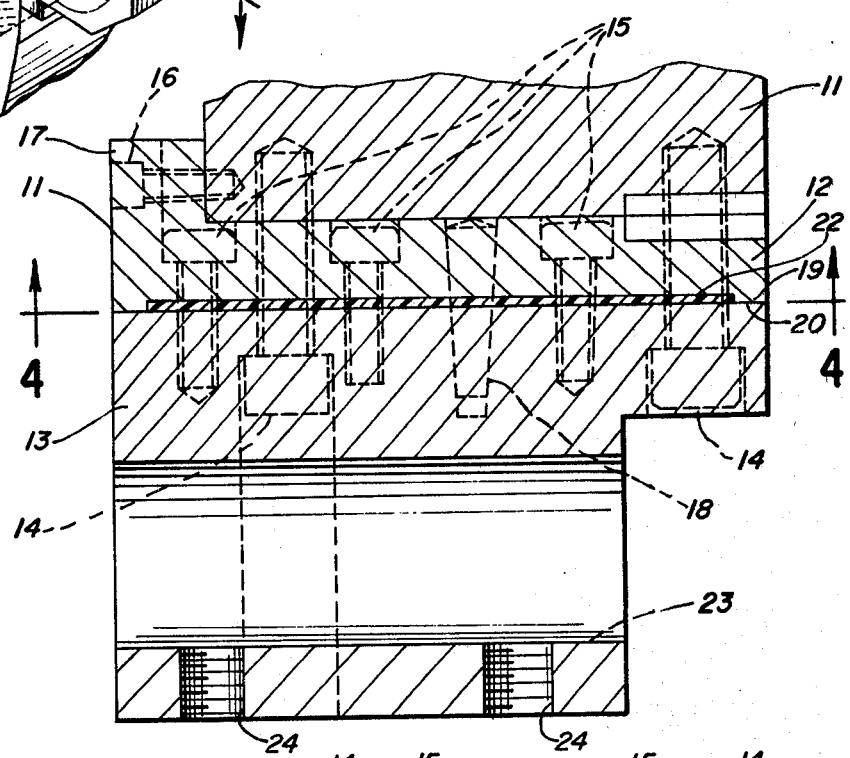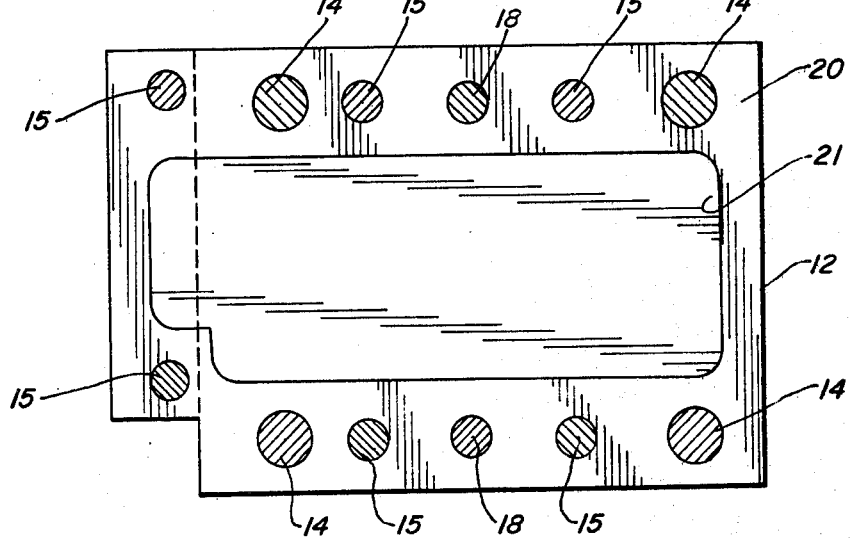

1

TOOL HOLDER

BACKGROUND OF THE INVENTION

1. Field of the Invention

This invention relates to tool holders and in particular to tool holders for holding cutting tools and the like in carrying out machining operations.

2. Description of the Background Art

It is conventional in the machining art to provide tool holders for supporting the tools used in the machining operations on the carrier which may comprise a carriage turret, a tool rest, etc. The tools are supported in the tool holders, or boring bars, and the tools holders or boring bars are, in turn, mounted to the carriers.

A problem arises in the use of such tools in that there is a tendency for the tool to vibrate or chatter during the machining operation. A substantial number of apparatuses and devices have been developed in attempting to solve the problem of such vibration and chattering.

One example of a tool holder having a vibration dampening means is illustrated in U.S. Pat. No. 2,960,189, of John G. Osburn. As shown therein, the tool, comprising a cutter, is operably mounted on an arbor which is secured in a horizontally disposed spindle journaled in a column of the milling machine. In operation, the vibrations of the tool, including the cutter, are transmitted to an overarm, causing it to vibrate transverse to its axis. Friction plates associated therewith move the overarm in the same manner. Masses connected to the overarm tend to remain at rest for a portion of one-quarter of a cycle and then start to move but lag behind the motion of the friction plates by virtue of their inertia so that the masses move in out-of-phase relationship to the friction plates. The resultant relative motion between the plates and masses causes energy of vibration in the overarm to be absorbed and converted into frictional energy which is dissipated as heat.

In Japanese Pat. No. 57-3504, a tool holder is shown to be clamped to a carrier by suitable bolts extending through a pair of pads disposed between the carrier and tool holder. A projection on the tool holder maintains the tool holder spaced from the carrier at opposite sides of the pads.

SUMMARY OF THE INVENTION

The present invention comprehends an improved tool holder for mounting a tool to a carrier with means for effectively minimizing chattering of the tool in machining use.

More specifically, the invention comprehends provision of an improved tool holder including a base member, means for mounting the base member to a carrier, a tool holding member, the members defining confronting planar surfaces, at least one of the surfaces being provided with a shallow recess opening toward the other surface, means for securing the tool holding member to the base member with at least a portion of the confronting surfaces in facial engagement, and a pad of resilient material in the recess compressed between the members for effectively minimizing chattering of a tool carried by the tool holder in machining use.

In the illustrated embodiment, the means for mounting the base member to the carrier further secures the tool holding member to the base member and carrier.

The invention comprehends more specifically that the recess have a depth of less than approximately 2 mm.

In the illustrated embodiment, the pad has an uncompressed thickness slightly greater than the depth of the recess.

In the illustrated embodiment, the pad comprises a rubber pad which illustratively is formed of neoprene.

In the illustrated embodiment, the tool holder members define confronting surfaces in facial engagement fully about the periphery of the recess receiving the pad.

In the illustrated embodiment, the pad is imperforate.

Further, in the illustrated embodiment, the securing means are distributed about the periphery of the recess and pad.

The tool holder of the present invention is extremely simple and economical of construction while yet providing a highly improved antichattering retention of the tool in the machining operation.

BRIEF DESCRIPTION OF THE DRAWING

Other features and advantages of the invention will be apparent from the following description taken in connection with the accompanying drawing wherein:

FIG. 1 is a fragmentary perspective view of a tool holder embodying the invention mounted to a turret carrier;

FIG. 2 is a fragmentary enlarged vertical section taken substantially along the line 2—2 of FIG. 1;

FIG. 3 is a fragmentary exploded section illustrating the arrangement of the parts prior to assembly of the tool holder; and FIG. 4 is a section taken substantially along the line 4—4 of FIG. 2.

DESCRIPTION OF THE PREFERRED EMBODIMENT

In the illustrative embodiment of the invention as disclosed in the drawing, a tool holder generally designated 10 is arranged to be mounted to a carrier 11 which illustratively comprises a turret of conventional construction. The tool holder of the present invention includes a base member 12 and a tool holding member 13 which are installed as a unit to the turret, as illustrated in FIG. 1.

More specifically, as illustrated in FIG. 2, the tool holder assembly 10 is secured to the turret 11 by suitable bolts 14. The tool holding member 13 is secured to the base member 12 in turn, by suitable bolts 15. An end bolt 16 extends through a turned end portion 17 of base member 12 for cooperating with bolts 14 in securing the tool holder to the carrier. Locating pins 18 are further provided for locating the members relative to each other.

Tool holding member 13 defines an inner, planar surface 19 confronting an outer, planar surface 20 of base member 12. At least one of these surfaces is provided with a shallow recess, and in the illustrated embodiment, as best seen in FIG. 3, surface 20 is provided with a shallow recess 21 opening toward surface 19 of tool holding member 13. A thin resilient pad 22 is received in the recess and, as illustreated in FIG. 3, has an uncompressed thickness greater than the depth of recess 21.

Base member surface 20 extends about the periphery of recess 21 and, as shown in FIG. 2, facially engages tool holding member surface 19 in the assembled arrangement of the tool holder members. As further shown in FIG. 2, in the assembled arrangement, pad 22 is compressed in recess 21 so as to permit the peripheral facial engagement of surfaces 19 and 20 about the recess so as to provide the direct mechanical mounting of the tool holding member 13 to the base member 12. It has been found unexpectedly, however that notwithstanding the direct facial engagement of the surfaces 19 and 20, the provision of the resilient pad 22 in the recess 21 causes the tool holder assembly to effectively resist vibration and chattering such as from machining operation of a tool T, as illustrated in FIG. 1, carried by the tool holding member 13. As illustrated in FIG. 2, the tool holding member includes a through bore 23 for receiving the shank of the tool T, which may be locked in the bore 23 by suitable set screws threaded through threaded openings 24 in the tool holding member.

The recess, illustratively, may have a depth of approximately 2 mm and, in the illustrated embodiment, the recess has a depth of approximately 1.5 mm., with the pad having a thickness of approximately 1.72 mm. so as to have an uncompressed thickness approximately 15% greater than the depth of the recess. In the illustrated embodiment, the pad comprises a neoprene rubber pad which has been found to provide excellent vibration resistance.

As seen in FIG. 4, the securing means extend through the periphery of the base member surrounding recess 21. Thus, the pad may be imperforate so as to effectively fill the recess in the assembly.

The invention further comprehends that the securing means, defined by bolts 14, augment the retention of the tool holder members in assembly effected by bolts 15. Thus, as shown in FIG. 2, bolts 14 further secure the tool holding member 13 to the base member 12, as well as securing the assembly to the carrier 11.

While bolts 14 and 15 effectively secure the tool holder members with the surfaces 19 and 20 in direct mechanical facial engagement, the provision of the pad 22 in recess 21 has been found to effectively minimize vibration and chattering so that an improved machining operation is effected by use of the improved tool holder 10 of the invention.

The tool holder of the present invention is extremely simple and economical of construction, while yet providing a highly improved antivibration, antichattering operation.

The foregoing disclosure of specific embodiments is illustrative of the broad inventive concepts comprehended by the invention.

I claim:

1. A tool holder for mounting a tool to a carrier, comprising:
   a base member;
   means for mounting the base member to a carrier;
   a tool holding member, said members defining confronting transverse surfaces, at least one of said surfaces being provided with a shallow recess extending from the center thereof to a peripheral portion thereof fully surrounding the recess, said recess opening toward the other surface;
   means for securing the tool holding member to the base member with at least portions of said confronting transverse surfaces at opposite sides of the recess in direct mechanical facial engagement; and
   a flat, transverse, continuous pad of resilient readily compressible material complementary to and received in said recess to be compressed between said members for effectively minimizing chattering of a tool carried by said tool holder in machining use in a direction transverely to said transverse surfaces, the thickness of the pad being substantially greater than the corresponding depth of the recess.

2. The tool holder of claim 1 wherein said means for mounting the base member to the carrier further secures the tool holding member to the base member and carrier.

3. The tool holder of claim 1 wherein said recess has a depth of less than approximately 2 mm.

4. The tool holder of claim 1 wherein said pad has an uncompressed thickness approximately 15% greater than the depth of said recess.

5. The tool holder of claim 1 wherein said pad comprises a rubber pad.

6. The tool holder of claim 1 wherein said pad comprises a neoprene rubber pad.

7. The tool holder of claim 1 wherein said members define confronting surfaces in facial engagement fully about the periphery of said recess.

8. The tool holder of claim 1 wherein said pad is imperforate.

9. The tool holder of claim 1 wherein said members define confronting surfaces in facial engagement fully about the periphery of said recess and said securing means are distributed about said periphery.

10. The tool holder of claim 1 wherein said confronting transverse surfaces are planar.

* * * * *